(12) United States Patent
Wang et al.

(10) Patent No.: US 10,943,337 B2
(45) Date of Patent: Mar. 9, 2021

(54) IMAGE PROCESSING APPARATUS AND METHOD FOR HIGH DYNAMIC RANGE EFFECT

(71) Applicant: Novatek Microelectronics Corp., Hsinchu (TW)

(72) Inventors: Shuyao Wang, Shaanxi (CN); Yongchao Li, Xi'an (CN); YuanJia Du, Shandong Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/427,328

(22) Filed: May 30, 2019

(65) Prior Publication Data

US 2020/0167903 A1 May 28, 2020

Related U.S. Application Data

(60) Provisional application No. 62/771,585, filed on Nov. 27, 2018.

(51) Int. Cl.
| | |
|---|---|
| *G06T 5/20* | (2006.01) |
| *G06T 5/00* | (2006.01) |
| *G09G 5/10* | (2006.01) |
| *G09G 5/00* | (2006.01) |

(52) U.S. Cl.
CPC ............... *G06T 5/009* (2013.01); *G06T 5/20* (2013.01); *G09G 5/005* (2013.01); *G09G 5/10* (2013.01); *G06T 2207/20028* (2013.01); *G06T 2207/20208* (2013.01); *G09G 2320/066* (2013.01); *G09G 2320/0666* (2013.01); *G09G 2320/0673* (2013.01); *G09G 2340/14* (2013.01)

(58) Field of Classification Search
CPC . G06T 5/009; G06T 5/20; G06T 2207/20028; G06T 2207/20208; G09G 5/10; G09G 2320/0666; G09G 2320/0673
See application file for complete search history.

(56) References Cited

U.S. PATENT DOCUMENTS

| | | | | |
|---|---|---|---|---|
| 8,050,511 | B2 * | 11/2011 | Daly | H04N 1/407 382/274 |
| 8,605,083 | B2 * | 12/2013 | Muijs | G06T 5/007 345/419 |
| 9,613,409 | B1 * | 4/2017 | Tsai | G09G 3/3406 |
| 2019/0130544 | A1 * | 5/2019 | Kitajima | G06T 5/002 |

* cited by examiner

*Primary Examiner* — Antonio A Caschera
(74) *Attorney, Agent, or Firm* — JCIPRNET

(57) ABSTRACT

An image processing apparatus and method for a high dynamic range effect includes a conversion circuit, a specular detection circuit, and a blending circuit. The conversion circuit converts first pixel data of the current pixel of a current frame to a second pixel data, wherein a luminance of the second pixel data is lower than a luminance of the first pixel data. The specular detection circuit detects a specular degree of the current frame to produce a specular map, wherein the specular map includes a specular degree value of a current pixel. The blending circuit blends the first pixel data and the second pixel data according to the specular degree value of the current pixel to obtain blended pixel data of the current pixel.

20 Claims, 8 Drawing Sheets

1

IMAGE PROCESSING APPARATUS AND METHOD FOR HIGH DYNAMIC RANGE EFFECT

CROSS-REFERENCE TO RELATED APPLICATION

This application claims the priority benefit of U.S. provisional application Ser. No. 62/771,585, filed on Nov. 27, 2018. The entirety of the above-mentioned patent applications is hereby incorporated by reference herein and made a part of this specification.

BACKGROUND

Field of the Invention

The invention relates to an image processing apparatus and more particularly, to an image processing apparatus and method for a high dynamic range (HDR) effect.

Description of Related Art

A conventional image processing apparatus processes a standard dynamic range (SDR) image (or a low dynamic range (LDR) image) and provides a processed SDR image (or a processed LDR image) to a high peak luminance display device. Namely, if an original image frame is an SDR image, the display device displays an image having an SDR effect. In a condition that the original image frame is an SDR image (or an LDR image), how to render an image having a high dynamic range (HDR) effect on the high peak luminance display device is an important subject to this field.

In a conventional image processing method, data transformation is proceeded by applying inverse tone mapping. Namely, the conventional technique expands the range through bit-number increasing. Tone mapping and inverse tone mapping adopt appropriate curves to achieve the data transformation and include linear transformation. A transformed HDR image frame shows a high dynamic range on a HDR display (i.e., the high peak luminance display device) which is close to the dynamic range of real world. However, the conventional technique relates to image type transformation and depends on the device capable of supporting displaying HDR standard resource. All conventional techniques focus on global contrast or local contrast enhancement to improve picture quality in contrast.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides an image processing apparatus and method to produce an image having a high dynamic range (HDR) effect.

According to an embodiment of the invention, an image processing apparatus is provided. The image processing apparatus includes a conversion circuit, a specular detection circuit and a blending circuit. The conversion circuit is configured to convert first pixel data of a current pixel of a current frame to a second pixel data, wherein a luminance of the second pixel data is lower than a luminance of the first pixel data. The specular detection circuit is configured to detect a specular degree of the current frame to produce a specular map, wherein the specular map includes a specular degree value of the current pixel. The first blending circuit is coupled to the conversion circuit to receive the second pixel data, and coupled to the specular detection circuit to receive the specular map. The first blending circuit is configured to blend the first pixel data and the second pixel data according to the specular degree value of the current pixel to obtain blended pixel data of the current pixel.

According to an embodiment of the invention, an image processing method is provided. The image processing method includes: converting first pixel data of a current pixel of a current frame to a second pixel data by a conversion circuit, wherein a luminance of the second pixel data is lower than a luminance of the first pixel data; detecting a specular degree of the current frame by a specular detection circuit to produce a specular map, wherein the specular map includes a specular degree value of the current pixel; and blending the first pixel data and the second pixel data according to the specular degree value of the current pixel by a first blending circuit to obtain blended pixel data of the current pixel.

To sum up, the image processing apparatus and method of the embodiments of the invention can convert the first pixel data of the current pixel of the current frame to the second pixel data which is darker. According to the specular map of the specular detection circuit, the first blending circuit can blend the first pixel data and the second pixel data to obtain the blended pixel data of the current pixel. For instance, when the current pixel is located in a specular region, the first blending circuit can increase a blending ratio of the first pixel data which is brighter in the blended pixel data. When the current pixel is located in a non-specular region, the first blending circuit can increase a blending ratio of the second pixel data which is darker in the blended pixel data. Thus, the image processing apparatus can produce an image having an HDR effect.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
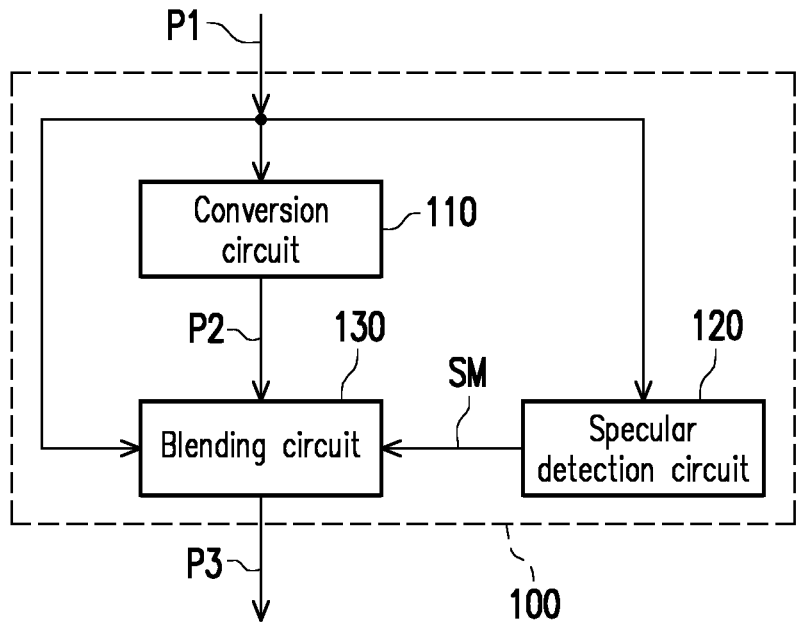
FIG. 1 is a schematic circuit block diagram illustrating an image processing apparatus according to an embodiment of the invention.

The term "couple (or connect)" throughout the specification (including the claims) of this application are used broadly and encompass direct and indirect connection or coupling means. For instance, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

The embodiments of the invention provide an image post processing technique to pursue a high dynamic range (HDR) resource effect. The processing of an image processing apparatus may be implemented in an original range of a standard dynamic range (SDR) image, and an output code range of the image processing apparatus may be the same as an input code range. Namely, an output image of the image processing apparatus may have an HDR effect in a premise that a bit-number of the output code is not increased.

For instance, the image processing apparatus may re-range a dynamic range of luminance by separating a specular region from a non-specular region. The specular region may be understood as a region having a low saturation degree but a high luminance. The image processing apparatus, in some embodiments, may also be operated together with a high peak luminance display device to render the output image of the image processing apparatus. Either the luminance or the color, the quality of the output image of the image processing apparatus may have an effect similar to that of a real HDR image.

FIG. 1 is a schematic circuit block diagram illustrating an image processing apparatus 100 according to an embodiment of the invention. In the embodiment illustrated in FIG. 1, the image processing apparatus 100 includes a conversion circuit 110, a specular detection circuit 120, and a blending circuit 130. The conversion circuit 110 may convert pixel data P1 of a current pixel of a current frame to pixel data P2, wherein a luminance of the pixel data P2 is lower than a luminance of the pixel data P1.

Figure 2:
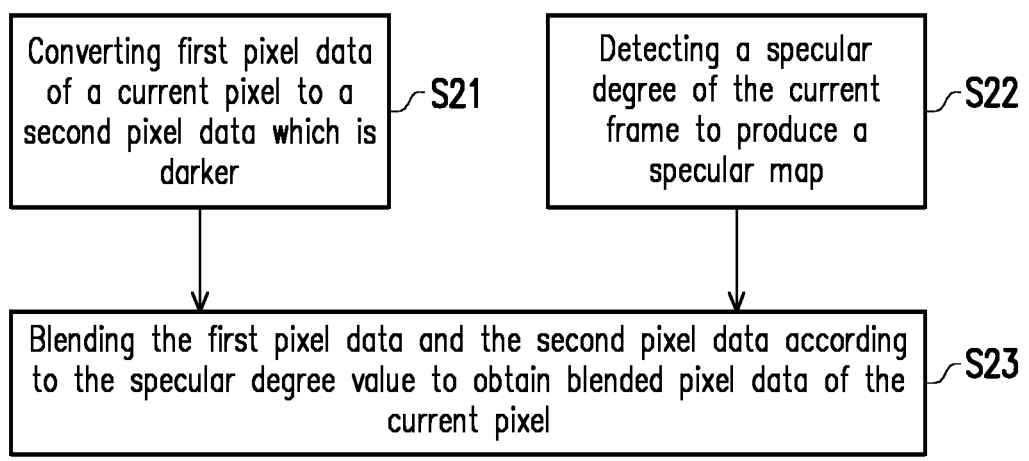
FIG. 2 is a flowchart illustrating an image processing method according to an embodiment of the invention.

FIG. 2 is a flowchart illustrating an image processing method according to an embodiment of the invention. Referring to FIG. 1 and FIG. 2, in step S21, the conversion circuit 110 may convert the pixel data P1 of the current pixel of the current frame to pixel data P2, wherein the luminance of the pixel data P2 is lower than the luminance of the pixel data P1. The conversion operation of the driving circuit 110 is not limited in the present embodiment. In some embodiments, the conversion circuit 110 may multiply the pixel data P1 by a certain ratio to obtain the pixel data P2. The ratio may be a fixed value or a dynamic value and may be determined based on a design requirement. For instance, the ratio may be a real number less than 1. A designer may define a peak luminance of the pixel data P2 by configuring the ratio.

In some other embodiments, the conversion circuit 110 may convert the pixel data P1 to the pixel data P2 according to a re-range curve. Namely, the conversion circuit 110 may re-range the pixel data P1 to reduce a peak value of a luminance range of pixels. A designer may define the peak luminance of the pixel data P2 by configuring the re-range curve.

In step S22, the specular detection circuit 120 may detect a specular degree of the current frame to produce a specular map SM, wherein the specular map SM includes a specular degree value of the current pixel. The specular map SM may show a specular probability of each pixel of an image frame, which represents the specular degree of each pixel. Namely, the specular detection circuit 120 may calculate a guidance which region will occupy a peak display luminance range. A specular detection method may offer a SM map which could show the specular degree, when specular degree equals to zero, the region is diffuse region. An implementation example of the specular detection circuit 120 will be described below.

The blending circuit 130 is coupled to the conversion circuit 110 to receive the pixel data P2. The blending circuit 130 is coupled to the specular detection circuit 120 to receive the specular map SM. In step S23, the blending circuit 130 may blend the pixel data P1 and the pixel data P2 according to the specular degree value of the current pixel to obtain blended pixel data P3 of the current pixel. The specular map SM is a degree map. Based on the specular map SM, the blending circuit 130 may re-distribute a dynamic range. The specular map SM may show the specular degree of each pixel of an image frame. A specular pixel with the highest degree value represents that it occupies the peak luminance. A non-specular pixel represents that it should be displayed based on its value and related re-ranged luminance range. The pixel between non-specular pixel and specular pixel will be displayed based on its specular degree value and blended by raw display luminance and its re-range display luminance range.

For instance, when the specular degree value of the specular map SM indicates that the current pixel is located in the specular region, the blending circuit 130 may increase a ratio of the pixel data P1 in the blended pixel data P3, and when the specular degree value of the specular map SM indicates that the current pixel is located in the non-specular region, the blending circuit 130 may increase a ratio of the pixel data P2 in the blended pixel data P3. Thus, the blending circuit 130 may reduce the peak value of the luminance range of the non-specular pixel and preserve a top luminance range of the specular region.

Moreover, for example, the blending circuit 130 may implement an alpha-blending operation to combine different luminance ranges. Thus, in some embodiments, the blending circuit 130 may calculate Formula F1 below to obtain the blended pixel data P3 of the current pixel, wherein a1 represents the specular degree value of the current pixel in the specular map SM.

$$P3=a1*P1+(1-a1)*P2 \quad \text{Formula F1}$$

In other words, when the current pixel is located in the specular region (i.e., the specular degree value a1 is close to 1), the blending circuit 130 may increase the blending ratio of the pixel data P1 which is brighter in the blended pixel data P3. When the current pixel is located in the non-specular region (i.e., the specular degree value a1 is close to 0), the blending circuit 130 may increase the blending ratio of the pixel data P2 which is darker in the blended pixel data P3. Thus, the image processing apparatus 100 may produce the image having an HDR effect. If it is assumed that the blended pixel data P3 (i.e., the image frame on which the signal post processing is performed) is provided to a high luminance display device, the specular region may be displayed by using a peak luminance of the display device. In addition, the image processing apparatus 100 may enhance the display dynamic range by re-range the luminance of the non-specular pixel, thereby rendering the HDR effect in the same display device.

Figure 3:
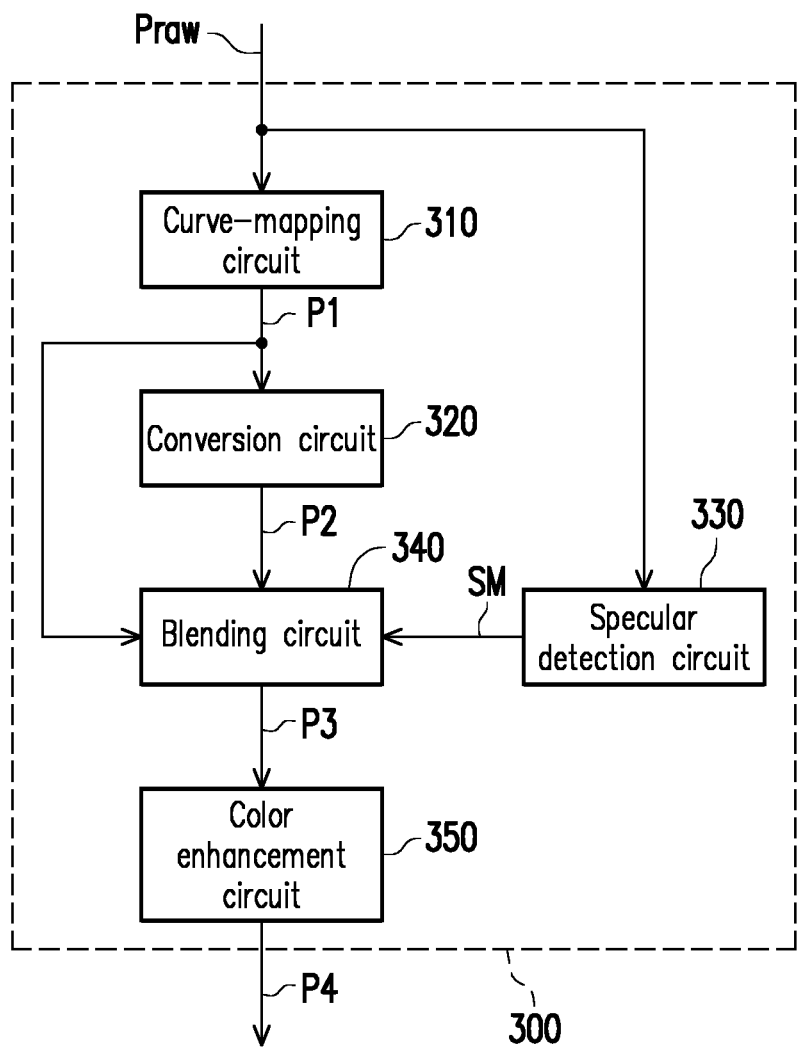
FIG. 3 is a schematic circuit block diagram illustrating an image processing apparatus according to another embodiment of the invention.

FIG. 3 is a schematic circuit block diagram illustrating an image processing apparatus 300 according to another embodiment of the invention. In the embodiment illustrated in FIG. 3, the image processing apparatus 300 includes a curve-mapping circuit 310, a conversion circuit 320, a specular detection circuit 330, a blending circuit 340 and a color enhancement circuit 350. The curve-mapping circuit 310 may convert raw pixel data Praw of the current pixel of the current frame to the pixel data P1. A mid-tone luminance of the pixel data P1 is lower than a mid-tone luminance of the raw pixel data Praw. Namely, the curve-mapping circuit 310 may adjust a luminance of an image to determine a luminance tone of the image. In some embodiments, the curve-mapping circuit 310 may convert the raw pixel data Praw to the pixel data P1 according to a certain Gamma curve. The Gamma curve may be determined based on a design requirement.

Figure 4:
FIG. 4 is a schematic diagram illustrating different Gamma curves according to an embodiment of the invention.

FIG. 4 is a schematic diagram illustrating different Gamma curves according to an embodiment of the invention. In FIG. 4, the horizontal axis represents the pixel data P1, and the vertical axis represents the luminance. FIG. 4 illustrates different luminance transfer curves, for example, a luminance transfer curve 401, a luminance transfer curve 402, a luminance transfer curve 403, a luminance transfer curve 404, a luminance transfer curve 405 and a luminance transfer curve 406. Referring to FIG. 3 and FIG. 4, the curve-mapping circuit 310 may convert the raw pixel data Praw to the pixel data P1 according to one of the luminance transfer curves 401 to 406 illustrated in FIG. 4. Based on a design requirement, the curve mapping may be implemented through a lookup table (LUT). A designer may change the Gamma curves by means of updating the LUT.

The image processing apparatus 300, the conversion circuit 320, the specular detection circuit 330 and the blending circuit 340 illustrated in FIG. 3 may be inferred with reference to the descriptions related to the image processing apparatus 100, the conversion circuit 110, the specular detection circuit 120 and the blending circuit 130 illustrated in FIG. 1 and thus, will not be repeated.

Figure 5:
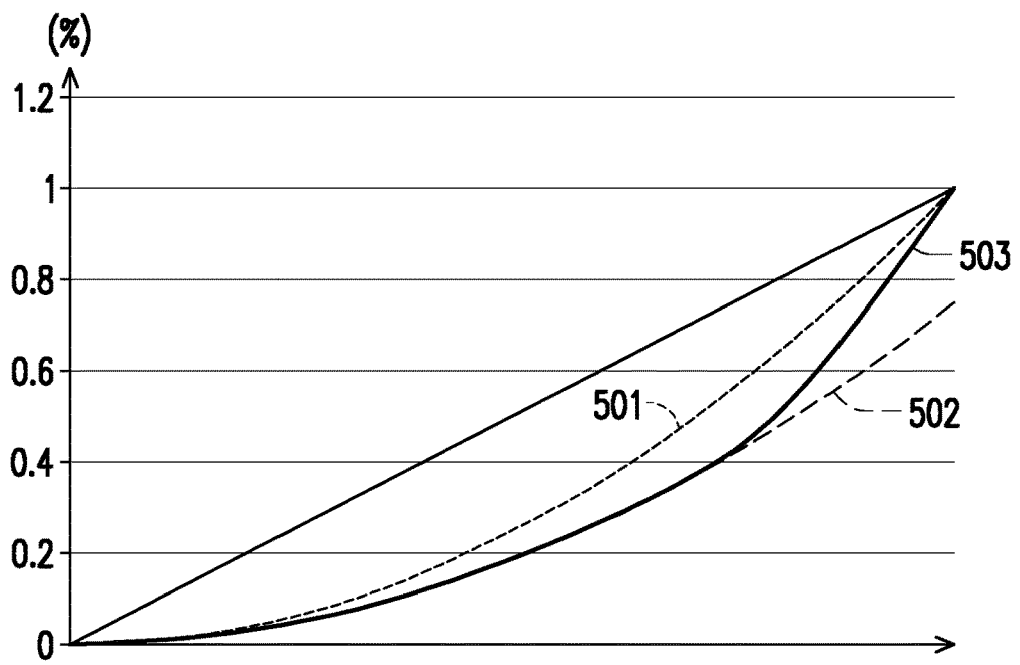
FIG. 5 is a schematic diagram illustrating a re-range curve according to an embodiment of the invention.

FIG. 5 is a schematic diagram illustrating a re-range curve according to an embodiment of the invention. In FIG. 5, the horizontal axis represents the pixel data, and the vertical axis represents the luminance. Referring to FIG. 3 and FIG. 5, a curve 501 illustrated in FIG. 5 represents a luminance transfer curve used by the curve-mapping circuit 310. A curve 502 illustrated in FIG. 5 represents a re-range curve used by the conversion circuit 320. The curves are used for adjusting luminance tones. A top signal value (i.e., a luminance) of the re-range curve 502 is lower than that of the curve 501. The conversion circuit 320 reduces a peak value of a curve-mapping result and multiplies the pixel data P1 by a ratio less than 1 to obtain the pixel data P2. A designer may define the peak luminance of the pixel data P2 by configuring the ratio.

The blending circuit 130 may blend the luminance transfer curve 501 and the re-range curve 502 to obtain a mapping transfer curve 503. The blended curve (i.e., the mapping transfer curve 503) shows the luminance range, and actual luminance values may vary with the pixels.

Referring to FIG. 3, the color enhancement circuit 350 is coupled to the blending circuit 340 to receive the blended pixel data P3. The color enhancement circuit 350 may enhance a saturation degree of the blended pixel data P3 to output enhanced pixel data P4. An implementation example of the color enhancement circuit 350 will be described below.

Figure 6:
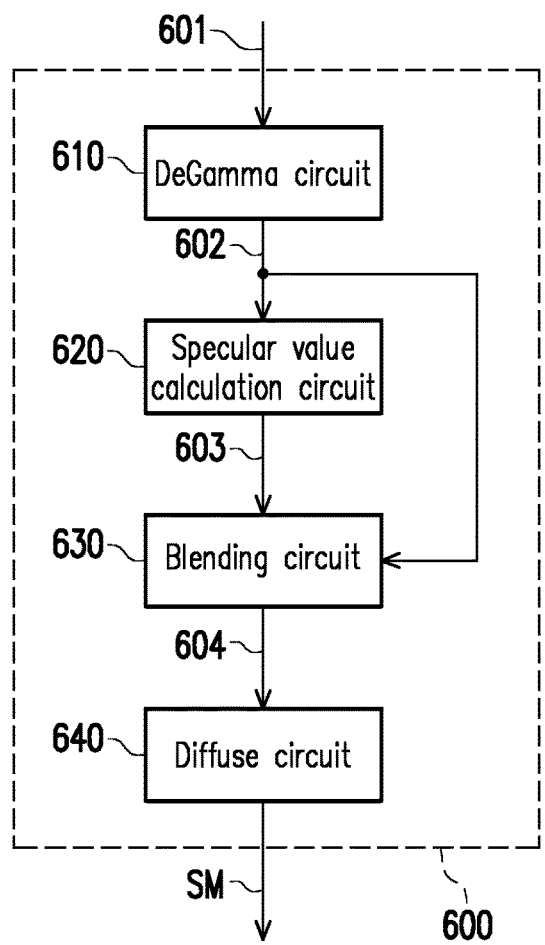
FIG. 6 is a schematic circuit block diagram illustrating a specular detection circuit according to an embodiment of the invention.

FIG. 6 is a schematic circuit block diagram illustrating a specular detection circuit 600 according to an embodiment of the invention. The specular detection circuit 120 illustrated in FIG. 2 and the specular detection circuit 330 illustrated in FIG. 3 may be inferred with reference to the description related to the specular detection circuit 600 illustrated in FIG. 6. If the specular detection circuit 120 illustrated in FIG. 1 is implemented by the specular detection circuit 600, a current frame 601 may include the pixel data P1 illustrated in FIG. 1. If the specular detection circuit 330 illustrated in FIG. 3 is implemented by the specular detection circuit 600, the current frame 601 may include the raw pixel data Praw illustrated in FIG. 3. In the embodiment illustrated in FIG. 6, the specular detection circuit 600 includes a deGamma circuit 610, a specular value calculation circuit 620, a blending circuit 630 and a diffuse circuit 640.

The deGamma circuit 610 may perform a deGamma operation on the current frame 601 to obtain a deGamma frame 602. The details related to the deGamma operation are not limited in the present embodiment. Based on a design requirement, in some embodiments, the deGamma operation may be a conventional deGamma operation or other deGamma operations. The details related to the conventional deGamma operation are not repeatedly described herein.

The specular value calculation circuit 620 is coupled to the deGamma circuit 610 to receive the deGamma frame 602. The specular value calculation circuit 620 may perform a specular calculation operation on the deGamma frame 602 to obtain a specular-value frame 603. The details related to the specular calculation operation are not limited in the present embodiment. Based on a design requirement, in some embodiments, the specular calculation operation may be a conventional specular calculation operation or other specular calculation operations. The details related to the conventional specular calculation operation are not repeatedly described herein.

In some other embodiments, the specular calculation operation may include Formula F2 below, wherein $\delta_F$ represents the specular value of the current pixel, MAX( ) represents a function to "fetch a maximum value", MIN( ) represents a function to "fetch a minimum value", SUM( ) represents a function to "sum up", and R, G and B respectively represent a red value, a green value and a blue value of the current pixel. If SUM(R, G, B)−3×MIN(R, G, B) is 0, the specular value $\delta_F$ may be defined as 0. After the specular value $\delta_F$ is calculated for each pixel of the deGamma frame 602, the specular value calculation circuit 620 may serve the specular values $\delta_F$ as the specular-value frame 603 to be transmit to the blending circuit 630.

$$\delta_F = \mathrm{MAX}\left(\frac{\mathrm{MAX}(R,G,B)}{\mathrm{SUM}(R,G,B)}, \frac{\mathrm{MAX}(R,G,B)-\mathrm{MIN}(R,G,B)}{\mathrm{SUM}(R,G,B)-3\times\mathrm{MIN}(R,G,B)}\right) \quad \text{Formula F2}$$

In yet other embodiments, the specular calculation operation may include Formula F2 set forth above and Formula F3 below. Formula F3 may correct the specular value $\delta_F$ of Formula F2. $\delta_{Fmax}$ represents an accurate specular value of the current pixel. If $3\times_{Fmax}$ is 0, the accurate specular value $\delta_{Fmax}$ may be defined as 0. After the specular value $\delta_{Fmax}$ is calculated for each pixel of the deGamma frame 602, the specular value calculation circuit 620 may serve the accurate specular values $\delta_{Fmax}$ as the specular-value frame 603 to be transmit to the blending circuit 630.

$$\delta_{Fmax} = \frac{\delta_F \times \mathrm{SUM}(R,G,B) - \mathrm{MAX}(R,G,B)}{3\times\delta_F - 1} \quad \text{Formula F3}$$

The blending circuit 630 is coupled to the specular value calculation circuit 620 to receive the specular-value frame 603. The blending circuit 630 is coupled to the deGamma circuit 610 to receive the deGamma frame 602. The blending circuit 630 blends the deGamma frame 602 and the specular-value frame 603 to obtain a blended frame 604. The blending circuit 630 is configured to control a smoothness of a specular map. The blending circuit 630 may effectively improve the controllability. The details related to the blending operation of the blending circuit 630 are not limited in the present embodiment. For instance, the blending circuit 630 may adopt the alpha-blending operation to blend the deGamma frame 602 and the specular-value frame 603. In some embodiments, the blending circuit 130 may calculate Formula F4 below, wherein P63 represents blended pixel data of a current pixel in the blended frame 604, a2 represents a blending ratio, P61 represents deGamma pixel data of the current pixel in the deGamma frame 602, and P62 represents a specular degree value of the current pixel in the specular-value frame 603. The blending ratio a2 may be any real number determined based on a design requirement, and a2 ranges from 0 to 1.

$$P63 = a2*P61 + (1-a2)*P62 \quad \text{Formula F4}$$

The diffuse circuit 640 is coupled to the blending circuit 630 to receive the blended frame 604. The diffuse circuit 640 may diffuse a halo shape of a specular spot of the blended frame 604 to obtain the specular map SM. The diffuse circuit 640 may modify an edge of the specular spot to show a natural specular map. For instance, the diffuse circuit 640 may define a sliding window in the blended frame 604 according to a position of the current pixel. In some embodiments, the diffuse circuit 640 may serve the position of the current pixel as the center of the sliding window and get 5*5 blocks in the blended frame 604 as the sliding window. The diffuse circuit 640 may serve a maximum value in the sliding window as the specular value of the current pixel. Thus, the diffuse circuit 640 may enlarge a range of the maximum specular value. After the specular value is calculated for each pixel of the blended frame 604, the diffuse circuit 640 may serve the specular values as a light diffusion frame.

The diffuse circuit 640 may adopt a bilateral grid filter to process light diffusion frame to obtain the specular map SM. For instance, the bilateral grid filter may use the light diffusion frame and the current frame 601 to perform a cross-bilateral grid filtering operation to obtain the specular map SM. The bilateral grid filter may be a conventional bilateral grid filter or other bilateral grid filters. The bilateral grid filter may solve an issue of sharp edges. The use of a cross-bilateral filter contributes to effective hardware implementation. The bilateral grid filter may process and down sample the current frame for building the grid while performing slicing by using data of the last frame at the same time.

Figure 7:
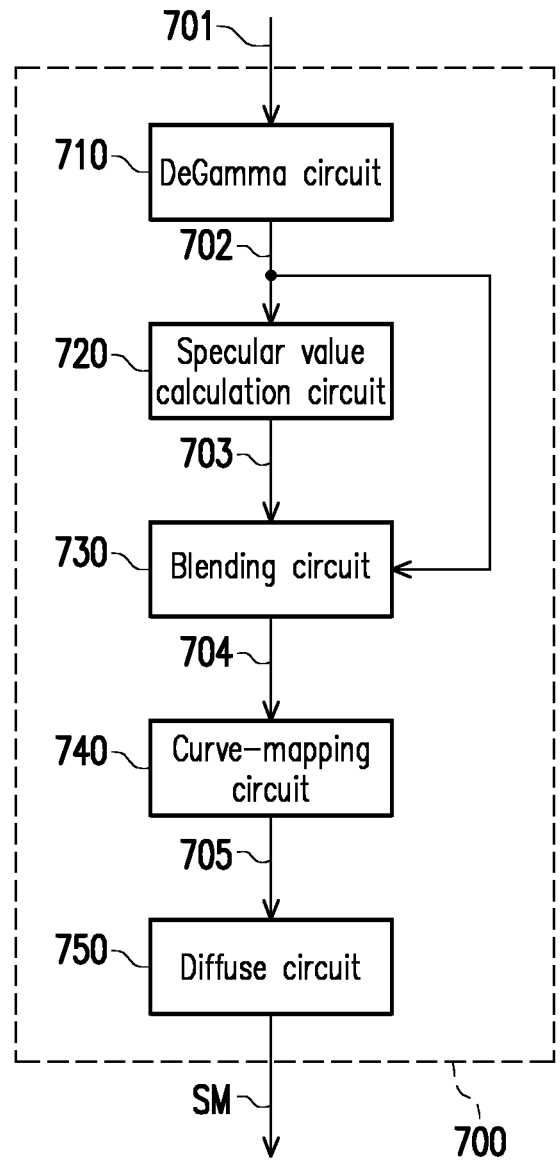
FIG. 7 is a schematic circuit block diagram illustrating a specular detection circuit according to another embodiment of the invention.

FIG. 7 is a schematic circuit block diagram illustrating a specular detection circuit 700 according to another embodiment of the invention. The specular detection circuit 120 illustrated in FIG. 2 and the specular detection circuit 330 illustrated in FIG. 3 may be inferred with reference to the description related to the specular detection circuit 700 illustrated in FIG. 7. If the specular detection circuit 120 illustrated in FIG. 1 is implemented by the specular detection circuit 700, a current frame 701 may include the pixel data P1 illustrated in FIG. 1. If the specular detection circuit 330 illustrated in FIG. 3 is implemented by the specular detection circuit 700, the current frame 701 may include the raw pixel data Praw illustrated in FIG. 3. In the embodiment illustrated in FIG. 7, the specular detection circuit 700 includes a deGamma circuit 710, a specular value calculation circuit 720, a curve-mapping circuit 740 and a diffuse circuit 750.

The deGamma circuit 710 may perform a deGamma operation on a current frame 701 to obtain a deGamma frame 702. The specular value calculation circuit 720 is coupled to the deGamma circuit 710 to receive the deGamma frame 702. The specular value calculation circuit 720 may perform a specular calculation operation on the deGamma frame 702 to obtain a specular-value frame 703. The blending circuit 730 is coupled to the specular value calculation circuit 720 to receive the specular-value frame 703. The blending circuit 730 is coupled to the deGamma circuit 710 to receive the deGamma frame 702. The blending circuit 730 may blend the deGamma frame 702 and the specular-value frame 703 to obtain a blended frame 704. The specular detection circuit 700, the deGamma circuit 710, the specular value calculation circuit 720 and the blending circuit 730 illustrated in FIG. 7 may be inferred with reference to the specular detection circuit 600, the deGamma circuit 610, the specular value calculation circuit 620 and the blending circuit 630 illustrated in FIG. 6, and the current frame 701, the deGamma frame 702, the specular-value frame 703 and the blended frame 704 illustrated in FIG. 7 may be inferred with reference to the descriptions related to the current frame 601, the deGamma frame 602, the specular-value frame 603 and the blended frame 604 illustrated in FIG. 6 and thus, will not be repeated.

In the embodiment illustrated in FIG. 7, the curve-mapping circuit 740 may convert blended pixel data of a current pixel of the blended frame 704 to mapped pixel data. After the mapped pixel data is calculated for each pixel of the blended frame 704, the curve-mapping circuit 740 may serve the mapped pixel data as a mapped frame 705. In some embodiments, the curve-mapping circuit 740 may convert the blended pixel data of the blended frame 704 to the mapped pixel data of the mapped frame 705 according to a certain conversion curve. The conversion curve may be determined based on a design requirement.

Figure 8:
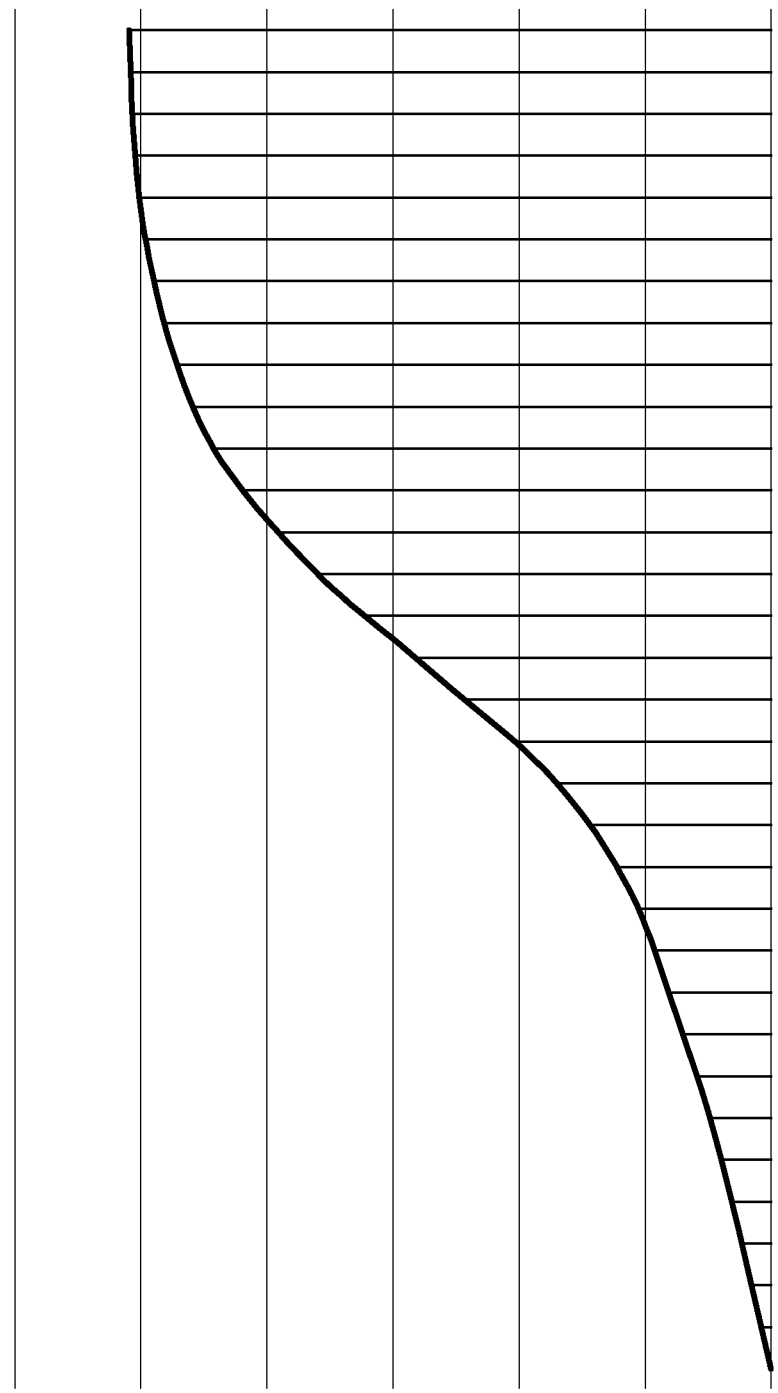
FIG. 8 is a schematic diagram illustrating a conversion curve according to an embodiment of the invention.

For instance, FIG. 8 is a schematic diagram illustrating a conversion curve according to an embodiment of the invention. In FIG. 8, the horizontal axis represents the blended pixel data of the blended frame 704, and the vertical axis represents the mapped pixel data of the mapped frame 705. The conversion curve is used to map a blending result of the blend frame 704 to a smoother specular map. Referring to FIG. 7 and FIG. 8, the curve-mapping circuit 740 may convert the blended pixel data of the blended frame 704 to the mapped pixel data of the mapped frame 705 according to the conversion curve illustrated in FIG. 8. Thus, the curve-mapping circuit 740 may enhance the difference of the luminance of the specular region and the diffuse region. Based on a design requirement, the curve mapping may be implemented through a lookup table (LUT). A designer may change the Gamma curves by means of updating the LUT.

Referring to FIG. 7, the diffuse circuit 750 is coupled to the curve-mapping circuit 740 to receive the mapped frame 705. The diffuse circuit 750 may diffuse a halo shape of a specular spot of the blended frame 705 to obtain the specular map SM. The diffuse circuit 750 illustrated in FIG. 7 may be inferred with reference to the description related to the diffuse circuit 640 illustrated in FIG. 6, and the mapped frame 705 and the specular map SM illustrated in FIG. 7 may be inferred with reference to the description related to the blended frame 604 and the specular map SM illustrated in FIG. 6, which will not be repeated.

Figure 9:
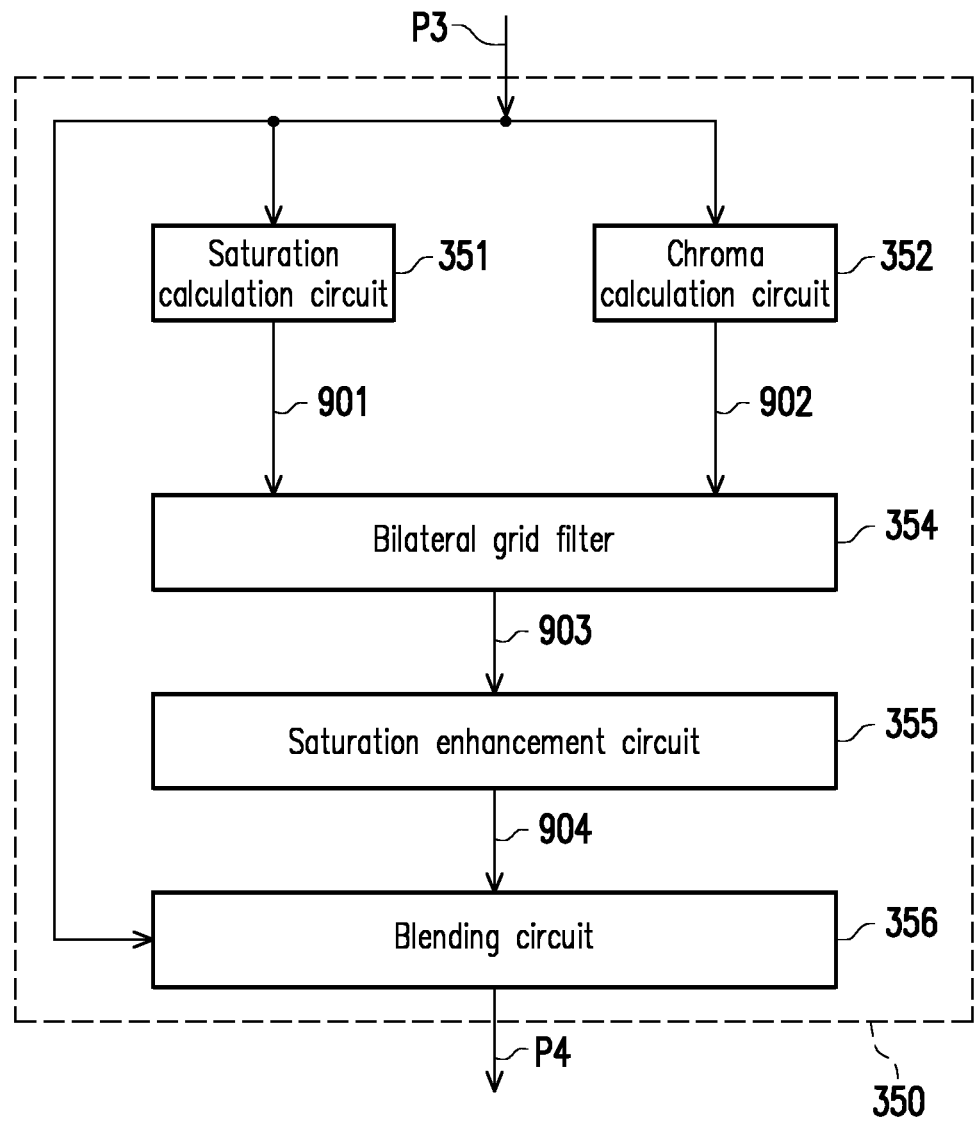
FIG. 9 is a schematic circuit block diagram illustrating the color enhancement circuit depicted in FIG. 3 according to an embodiment of the invention.

FIG. 9 is a schematic circuit block diagram illustrating the color enhancement circuit 350 depicted in FIG. 3 according to an embodiment of the invention. The color enhancement circuit 350 illustrated in FIG. 9 includes a saturation calculation circuit 351, a chroma calculation circuit 352, a bilateral grid filter 354, a saturation enhancement circuit 355 and a blending circuit 356. The saturation calculation circuit 351 may perform a saturation calculation operation on the blended pixel data P3 to obtain a saturation degree 901. The details related to the saturation calculation operation are not limited in the present embodiment. For instance, in some embodiments, the saturation calculation operation may include a conventional saturation algorithm or other saturation calculation manners. Alternatively, the saturation calculation operation may include Formula F5 below, wherein MAX( ) represents a function to "fetch a maximum value", MIN( ) represents a function to "fetch a minimum value", and R, G and B respectively represent a red value, a green value and a blue value of the current pixel (i.e., the blended pixel data P3).

$$\text{Saturation degree} = \frac{\text{MAX}(R, G, B) - \text{MIN}(R, G, B)}{\text{MAX}(R, G, B)} \quad \text{Formula F5}$$

The chroma calculation circuit 352 may perform a chroma calculation operation on the blended pixel data P3 to obtain a chroma degree 902. The chroma calculation circuit 352 may obtain chroma data of each pixel and adjust a saturation enhancement gain by using a chroma map. The details related to the chroma calculation operation are not limited in the present embodiment. For instance, in some embodiments, the chroma calculation operation may include a conventional chroma algorithm or other chroma calculation manners. Alternatively, the chroma calculation operation may include Formula F6 below, wherein MAX( ) represents a function to "fetch a maximum value", MIN( ) represents a function to "fetch a minimum value", and R, G and B respectively represent a red value, a green value and a blue value of the current pixel (i.e., the blended pixel data P3).

$$\text{Chroma degree} = \text{MAX}(R, G, B) - \text{MIN}(R, G, B) \quad \text{Formula F6}$$

The bilateral grid filter 354 is coupled to the saturation calculation circuit 351 to receive the saturation degree 901. The bilateral grid filter 354 is coupled to the chroma calculation circuit 352 to receive the chroma degree 902. The bilateral grid filter 354 may perform a cross-bilateral grid filtering operation on the saturation degree 901 and the chroma degree 902 to obtain filtered pixel data 903. The bilateral grid filter may be a conventional bilateral grid filter or other bilateral grid filters. Since a saturation map has sharp edges in certain images, the bilateral grid filter may process the chroma map to smooth a gain map. The use of a cross-bilateral grid filter contributes to effective hardware implementation. The gain map become appropriate after being smoothed by the filter.

The saturation enhancement circuit 355 is coupled to the bilateral grid filter 354 to receive the filtered pixel data 903. The saturation enhancement circuit 355 may perform a saturation enhancement operation on the filtered pixel data 903 to obtain enhanced pixel data 904. The details related to the saturation enhancement operation are not limited in the present embodiment. For instance, in some embodiments, the saturation enhancement operation may include a conventional saturation enhancement algorithm or other saturation enhancement manners. Alternatively, the saturation enhancement operation may include Formulas F7, F8 and F9 below, wherein ColorEnhR, ColorEnhG and ColorEnhB represents enhanced red pixel data, enhanced green pixel data and enhanced blue pixel data, gainMap represents the filtered pixel data (i.e., the filtered pixel data 903 provided by the bilateral grid filter 354) of the current pixel, and R, G and B respectively represent a red value, a green value and a blue value of the current pixel (i.e., the blended pixel data P3), and MIN( ) represents a function to "fetch a minimum value". The enhanced red pixel data ColorEnhR, the enhanced green pixel data ColorEnhG and the enhanced blue pixel data ColorEnhB are contents of the enhanced pixel data 904.

$$\text{ColorEnhR} = (2 - \text{gainMap}) \times (R - \text{MIN}(R, G, B)/2) \quad \text{Formula F7}$$

$$\text{ColorEnhG} = (2 - \text{gainMap}) \times (G - \text{MIN}(R, G, B)/2) \quad \text{Formula F8}$$

$$\text{ColorEnhB} = (2 - \text{gainMap}) \times (B - \text{MIN}(R, G, B)/2) \quad \text{Formula F9}$$

The blending circuit 356 is coupled to the saturation enhancement circuit 355 to receive the enhanced pixel data 904. The blending circuit 356 is coupled to the blending circuit 340 to receive the blended pixel data P3. The blending circuit 356 may blend the enhanced pixel data 904 and the blended pixel data P3 to output the enhanced pixel data P4. The blending circuit 356 may adjust the enhancement degree of the saturation enhancement circuit result 904 with the input P3. The details related to the blending operation of the blending circuit 356 are not limited in the present embodiment. For instance, the blending circuit 356 may adopt an alpha-blending operation to blend the enhanced pixel data 904 and the blended pixel data P3. Alternatively, the blending operation of the blending circuit 356 may be inferred with reference to the description related to the blending circuit 630 illustrated in FIG. 6.

Figure 10:
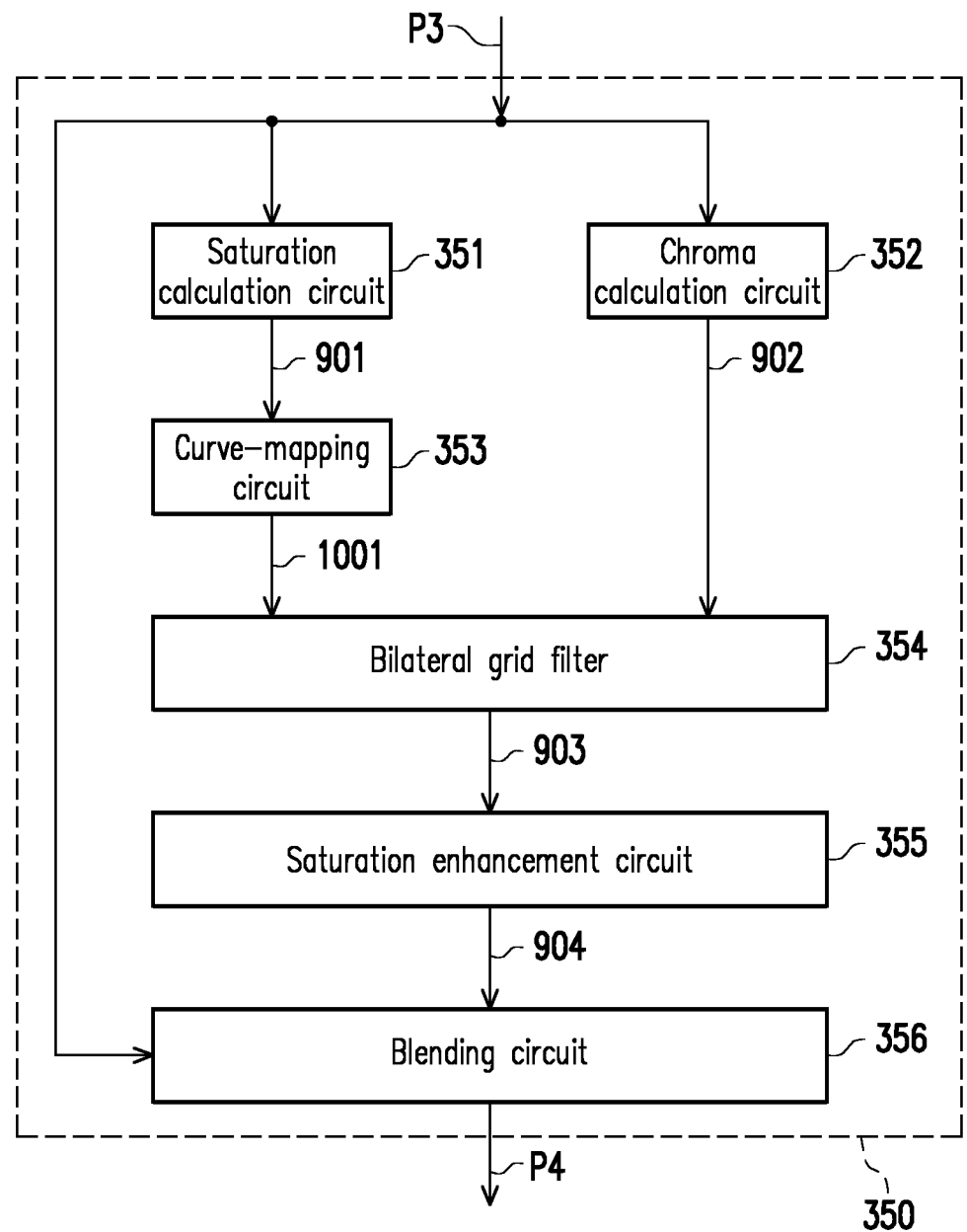
FIG. 10 is a schematic circuit block diagram illustrating the color enhancement circuit depicted in FIG. 3 according to another embodiment of the invention.

FIG. 10 is a schematic circuit block diagram illustrating the color enhancement circuit 356 depicted in FIG. 3 according to another embodiment of the invention. The color enhancement circuit 350 illustrated in FIG. 10 includes a saturation calculation circuit 351, a chroma calculation circuit 352, a curve-mapping circuit 353, a bilateral grid filter 354, a saturation enhancement circuit 355 and a blending circuit 356. The calculation circuit 351, the chroma calculation circuit 352, the bilateral grid filter 354, the saturation enhancement circuit 355 and the blending circuit 356 may be inferred with reference to the descriptions related to the embodiment illustrated in FIG. 9 and will not be repeated.

In the embodiment illustrated in FIG. 10, a curve-mapping circuit 353 may convert the saturation degree 901 to the mapped pixel data. In order to adjust a smoothness of a saturation map (of the saturation degree 901), the curve-mapping circuit 353 may perform a curve-mapping operation on the saturation degree 901. The details related to the curve-mapping operation of the blending circuit 353 are not limited in the present embodiment. For instance, the curve-mapping circuit 353 may adopt a conventional curve-mapping operation or other curve-mapping operations. Alternatively, the curve-mapping operation of the curve-mapping circuit 353 may be inferred with reference to the description related to the curve-mapping circuit 740 illustrated in FIG. 7 and is different from the curve-mapping operation of the curve-mapping circuit 740 illustrated in FIG. 7 in that the purpose of the curve-mapping operation of the curve-mapping circuit 353 is to smooth the saturation degree 901 to provide a smoothed saturation degree 1001.

In the embodiment illustrated in FIG. 10, the bilateral grid filter 354 is coupled to the curve-mapping circuit 353 to receive the smoothed saturation degree 1001. The bilateral grid filter 354 is coupled to the chroma calculation circuit 352 to receive the chroma degree 902. The bilateral grid filter 354 may perform the cross-bilateral grid filtering operation on the smoothed saturation degree 1001 and the chroma degree 902 to obtain the filtered pixel data 903.

Based on different design demands, the conversion circuit 110, the specular detection circuit 120, the blending circuit 130, the curve-mapping circuit 310, the conversion circuit 320, the specular detection circuit 330, the blending circuit 340 and/or the color enhancement circuit 350 may be implemented in a form of hardware and/or firmware. In terms of the hardware form, blocks of the conversion circuit 110, the specular detection circuit 120, the blending circuit 130, the curve-mapping circuit 310, the conversion circuit 320, the specular detection circuit 330, the blending circuit 340 and/or the color enhancement circuit 350 may be implemented in a logic circuit on an integrated circuit.

Related functions of the conversion circuit 110, the specular detection circuit 120, the blending circuit 130, the curve-mapping circuit 310, the conversion circuit 320, the specular detection circuit 330, the blending circuit 340 and/or the color enhancement circuit 350 may be implemented as hardware by utilizing hardware description languages (e.g., Verilog HDL or VHDL) or other suitable programming languages. For instance, the related functions of the conversion circuit 110, the specular detection circuit 120, the blending circuit 130, the curve-mapping circuit 310, the conversion circuit 320, the specular detection circuit 330, the blending circuit 340 and/or the color enhancement circuit 350 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the firmware form, the related functions of the conversion circuit 110, the specular detection circuit 120, the blending circuit 130, the curve-mapping circuit 310, the conversion circuit 320, the specular detection circuit 330, the blending circuit 340 and/or the color enhancement circuit 350 may be implemented as programming codes. The programming codes may be recorded/stored in a recording medium. The aforementioned recording medium includes a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a non-transitory computer readable medium, such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication medium.

In light of the foregoing, the image processing apparatus and method of the embodiments of the invention can convert the first pixel data of the current pixel of the current frame to the second pixel data which is darker. According to the specular map of the specular detection circuit, the blending circuit can blend the first pixel data and the second pixel data to obtain the blended pixel data of the current pixel. For instance, when the current pixel is located in the specular region, the blending circuit can increase the blending ratio of the first pixel data which is brighter in the blended pixel data. When the current pixel is located in the non-specular region, the blending circuit can increase the blending ratio of the second pixel data which is darker in the blended pixel data. Thus, the image processing apparatus can produce the image having the HDR effect.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image processing apparatus, comprising:
a conversion circuit, configured to convert first pixel data of a current pixel of a current frame to a second pixel data, wherein a luminance of the second pixel data is lower than a luminance of the first pixel data;
a specular detection circuit, configured to detect a specular degree of the current frame to produce a specular map, wherein the specular map includes a specular degree value of the current pixel; and
a first blending circuit, coupled to the conversion circuit to receive the second pixel data, coupled to the specular detection circuit to receive the specular map, and configured to blend the first pixel data and the second pixel data according to the specular degree value of the current pixel to obtain blended pixel data of the current pixel.

2. The image processing apparatus according to claim 1, wherein the conversion circuit converts the first pixel data to the second pixel data according to a re-range curve.

3. The image processing apparatus according to claim 1, wherein the first blending circuit increases a blending ratio of the first pixel data in the blended pixel data when the specular degree value indicates that the current pixel is located in a specular region; and the first blending circuit increases a blending ratio of the second pixel data in the blended pixel data when the specular degree value indicates that the current pixel is located in a non-specular region.

4. The image processing apparatus according to claim 1, wherein the first blending circuit calculates P3=a1*P1+(1−a1)*P2 to obtain the blended pixel data of the current pixel, wherein P3 represents the blended pixel data, a1 represents the specular degree value of the current pixel, P1 represents the first pixel data of the current pixel, and P2 represents the second pixel data of the current pixel.

5. The image processing apparatus according to claim 1, wherein the specular detection circuit comprises:
a deGamma circuit, configured to perform a deGamma operation on the current frame to obtain a deGamma frame;
a specular value calculation circuit, coupled to the deGamma circuit to receive the deGamma frame, and configured to perform a specular calculation operation on the deGamma frame to obtain a specular-value frame;
a second blending circuit, coupled to the specular value calculation circuit to receive the specular-value frame, coupled to the deGamma circuit to receive the deGamma frame, and configured to blend the deGamma frame and the specular-value frame to obtain a blended frame; and
a diffuse circuit, coupled to the second blending circuit to receive the blended frame, and configured to diffuse a halo shape of a specular spot of the blended frame to obtain the specular map.

6. The image processing apparatus according to claim 5, wherein the diffuse circuit defines a sliding window in the blended frame according to a position of the current pixel, the diffuse circuit serves a maximum value in the sliding window as a specular value of the current pixel to obtain a diffused frame, and the diffuse circuit adopts a bilateral grid filter to process the diffused frame to obtain the specular map.

7. The image processing apparatus according to claim 1, further comprising:
a curve mapping circuit, configured to convert raw pixel data of the current pixel of the current frame that has not been processed by the curve mapping circuit to the first pixel data, wherein a mid-tone luminance of the first pixel data is lower than a mid-tone luminance of the raw pixel data.

8. The image processing apparatus according to claim 7, wherein the curve mapping circuit converts the raw pixel data to the first pixel data according to a luminance transfer curve.

9. The image processing apparatus according to claim 1, further comprising:
a color enhancement circuit, coupled to the first blending circuit to receive the blended pixel data, and configured to enhance a saturation degree of the blended pixel data.

10. The image processing apparatus according to claim 9, wherein the color enhancement circuit comprises:
a saturation calculation circuit, configured to perform a saturation calculation operation on the blended pixel data to obtain a saturation degree;

a chroma calculation circuit, configured to perform a chroma calculation operation on the blended pixel data to obtain a chroma degree;
a bilateral grid filter, coupled to the saturation calculation circuit to receive the saturation degree, coupled to the chroma calculation circuit to receive the chroma degree, and configured to perform a cross-bilateral grid filtering operation on the saturation degree and the chroma degree to obtain filtered pixel data;
a saturation enhancement circuit, coupled to the bilateral grid filter to receive the filtered pixel data, and configured to perform a saturation enhancement operation on the filtered pixel data to obtain enhanced pixel data; and
a second blending circuit, coupled to the saturation enhancement circuit to receive the enhanced pixel data, coupled to the first blending circuit to receive the blended pixel data, and configured to blend the enhanced pixel data and the blended pixel data to enhance a saturation degree of the blended pixel data.

11. An image processing method, comprising:
converting first pixel data of a current pixel of a current frame to a second pixel data by a conversion circuit, wherein a luminance of the second pixel data is lower than a luminance of the first pixel data;
detecting a specular degree of the current frame by a specular detection circuit to produce a specular map, wherein the specular map includes a specular degree value of the current pixel; and
blending the first pixel data and the second pixel data according to the specular degree value of the current pixel by a first blending circuit to obtain blended pixel data of the current pixel.

12. The image processing method according to claim 11, wherein the step of converting the first pixel data of the current pixel of the current frame to the second pixel data comprises:
converting the first pixel data to the second pixel data according to a re-range curve by the conversion circuit.

13. The image processing method according to claim 11, wherein the step of blending the first pixel data and the second pixel data comprises:
increasing a blending ratio of the first pixel data in the blended pixel data by the first blending circuit when the specular degree value indicates that the current pixel is located in a specular region; and
increasing a blending ratio of the second pixel data in the blended pixel data by the first blending circuit when the specular degree value indicates that the current pixel is located in a non-specular region.

14. The image processing method according to claim 11, wherein the step of blending the first pixel data and the second pixel data comprises:
calculating P3=a1*P1+(1−a1)*P2 by the first blending circuit to obtain the blended pixel data of the current pixel, wherein P3 represents the blended pixel data, a1 represents the specular degree value of the current pixel, P1 represents the first pixel data of the current pixel, and P2 represents the second pixel data of the current pixel.

15. The image processing method according to claim 11, wherein the step of detecting the specular degree of the current frame comprises:
performing a deGamma operation on the current frame by a deGamma circuit to obtain a deGamma frame;
performing a specular calculation operation on the deGamma frame by a specular value calculation circuit to obtain a specular-value frame;

blending the deGamma frame and the specular-value frame by a second blending circuit to obtain a blended frame; and diffusing a halo shape of a specular spot of the blended frame by a diffuse circuit to obtain the specular map.

16. The image processing method according to claim 15, wherein the step of obtaining the specular map comprises:

defining a sliding window in the blended frame according to a position of the current pixel by the diffuse circuit;

serving a maximum value in the sliding window as a specular value of the current pixel by the diffuse circuit to obtain a diffused frame; and adopting a bilateral grid filter to process the diffused frame by the diffuse circuit to obtain the specular map.

17. The image processing method according to claim 11, further comprising:

converting raw pixel data of the current pixel of the current frame that has not been processed by a curve mapping circuit to the first pixel data by the curve mapping circuit, wherein a mid-tone luminance of the first pixel data is lower than a mid-tone luminance of the raw pixel data.

18. The image processing method according to claim 17, wherein the step of converting the raw pixel data of the current pixel of the current frame to the first pixel data comprises:

converting the raw pixel data to the first pixel data according to a luminance transfer curve by the curve mapping circuit.

19. The image processing method according to claim 11, further comprising:

enhancing a saturation degree of the blended pixel data by a color enhancement circuit.

20. The image processing method according to claim 19, wherein the step of enhancing the saturation degree of the blended pixel data comprises:

performing a saturation calculation operation on the blended pixel data by a saturation calculation circuit to obtain a saturation degree;

performing a chroma calculation operation on the blended pixel data by a chroma calculation circuit to obtain a chroma degree;

performing a cross-bilateral grid filtering operation on the saturation degree and the chroma degree by a bilateral grid filter to obtain filtered pixel data;

performing a saturation enhancement operation on the filtered pixel data by a saturation enhancement circuit to obtain enhanced pixel data; and blending the enhanced pixel data and the blended pixel data by a second blending circuit to enhance a saturation degree of the blended pixel data.

* * * * *